(No Model.)
F. L. DECARIE & P. LORD.
HOSE ATTACHMENT.
No. 435,734. Patented Sept. 2, 1890.
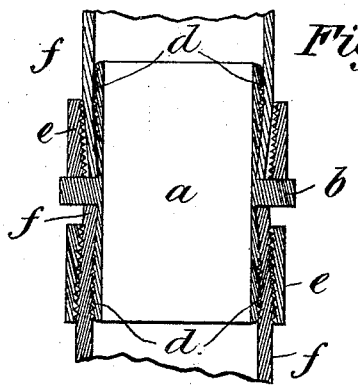
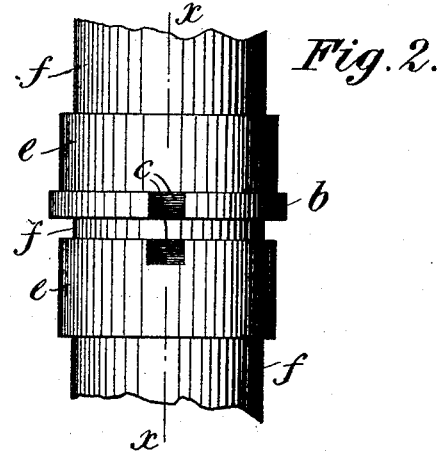
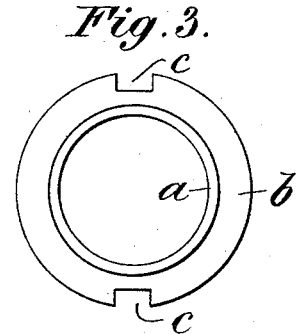
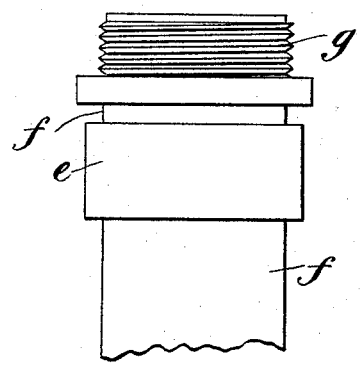
Witnesses.
John Lee
John Morrison.
Inventors.
Felix L. Decarie,
Peter Lord
By their Attorney
Charles G. C. Simpson

UNITED STATES PATENT OFFICE.

FELIX LOUIS DECARIE AND PETER LORD, OF MONTREAL, CANADA, ASSIGNORS TO SAID DECARIE AND JOHN LEE, OF SAME PLACE.

HOSE ATTACHMENT.

SPECIFICATION forming part of Letters Patent No. 435,734, dated September 2, 1890.

Application filed May 1, 1890. Serial No. 350,169. (No model.)

*To all whom it may concern:*

Be it known that we, FELIX LOUIS DECARIE and PETER LORD, both subjects of the Queen of Great Britain, and residing at the city of Montreal, in the District of Montreal, and Province of Quebec, Canada, have invented new and useful Improvements in Hose Attachments, of which the following is a specification.

Our invention relates to an improved sleeve or bush for attaching two ends of hose together, which, when made in single form on the parts of hose-couplings, may be used for attaching the halves of the hose-couplings to their respective hose; and the objects of our invention are to provide a ready and secure means for repairing bursts in hose, one by which the burst will not take any longer to repair than it would do to disconnect the burst length of hose from the line of other hose with which it is connected; also, to provide a ready and secure means of attaching the halves of the hose-couplings to the respective ends of the length of hose. We attain these objects by the construction illustrated in the accompanying drawings, in which similar letters of reference indicate like parts.

Figure 1 is a longitudinal section on line $x\ x$, Fig. 2, of a construction embodying our invention. Fig. 2 is an elevation of the construction shown in Fig. 1. Fig. 3 is an end elevation of the sleeve $a$ detached. Fig. 4 is an elevation of one-half of a hose-coupling attached to a hose according to our invention.

Letter $a$ is a sleeve which, as shown in Fig. 1, is made with a flange $b$, situated about midway of its length. This is provided with notches $c$ for holding it with an ordinary hose-wrench in the ordinary way. Each part of the sleeve $a$ projecting on each side of the flange $b$ is tapered from the flange $b$ to their outer extremities, and provided with a screw-thread $d$, thus forming a serrated surface for the hose $f$ to be compressed into and to interlock with, as shown, the whole being of such size that the ends of the sleeve $a$ will fit snugly in the hose they are intended to be used with.

$e$ are screw-threaded collars or nuts having each a tapered bore tapered from the face next the flange $b$ to the outer face, (see Fig. 1,) upon which a screw-thread is cut, also forming a serrated surface for the hose $f$ to be compressed into and to interlock with. These are in size of bore large enough to pass freely over the ends of the sleeve $a$, when the end of the hose is not in connection therewith, and are, furthermore, adapted so that when in place in the position of the collar $e$, in the upper part of Figs. 1 and 2, there will be sufficient space for the end of the hose $f$ to enter freely between the collar and sleeve. As soon as the end of the hose is in place the collar $e$ is pushed outward and screwed out upon the hose until by reason of its tapered bore and the taper of the end of the sleeve $a$ the end of the hose is compressed into the screw-threads of both and jammed solid between the two, or to completely fill and thus interlock with the serrations thus provided on both sides of the end of the hose $f$, as shown in the lower part of Fig. 1. The threads or serrations of the collar $e$ and of the sleeve $a$ are arranged to each separately interlock with the hose, as above described. This enables a perfect hold or interlocking of the hose by the parts, otherwise a space would be formed from which the hose could slip or withdraw by the action of continued pressure applied to the hose in the ordinary manner. This is an important feature in our invention. Both collars $e$ are provided with notches $c$ to operate them by a hose-wrench.

When this invention is used with either of the halves of a hose-coupling the sleeve $a$ is made altogether on one side of the coupling, the single end having only one collar $e$, as shown in Fig. 4. In all other respects it is made and operated as shown in Fig. 1, and as above described.

The greatest merit of our invention is in the repairing of burst hose, which often more particularly occurs at fires when great lengths of hose are required to reach from the water-supply to the spot where the water is to be applied at. At all such times, when every available length of hose is in use, should a burst occur it often incapacitates that line of hose from rendering effective service until the burst is repaired, in which case with our invention it is only necessary to cut out the burst part by cutting square across and introduce the sleeve, &c., as shown in Fig. 1, which can be done in a very short space of time, and the hose is just as effective as before the burst took place. By the above-described arrangement of tapers of the end or ends of the sleeve a, the more pressure that is put upon the hose, and therefore the more force that is exercised to pull the ends of the hose off the sleeve, the more the collars e will be drawn down to hold the hose the tighter, should the collars e not have been screwed out sufficiently tight in the first place.

We do not claim the invention broadly, but only in connection with the tapers of the sleeves and collars, arranged substantially as described. To arrange these in an opposite direction in relation to the end of the hose is old.

What we claim is as follows:

The combination, in a hose attachment, of the sleeve a, having shoulder b thereon, and having the portion d tapering from its end to the shoulder, and externally screw-threaded for engaging with the hose, of the sleeve adapted to bear at its end against said shoulder, and having its internal surface screw-threaded for engagement with the hose, said surface tapering from the shoulder to its opposite end, and said sleeve being constructed of a single continuous ring with unbroken inner surface, substantially as described.

FELIX L. DECARIE.
PETER LORD.

Witnesses:
CHARLES G. C. SIMPSON,
JOHN MORRISON.